(12) United States Patent
Yoshino et al.

(10) Patent No.: US 8,995,452 B2
(45) Date of Patent: *Mar. 31, 2015

(54) PACKET ROUTING APPARATUS

(71) Applicant: Hitachi, Ltd., Tokyo (JP)

(72) Inventors: Shigeki Yoshino, Hadano (JP);
Hidemitsu Higuchi, Ebina (JP); Naoya Ikeda, Yokohama (JP); Yoshitaka Sainomoto, Sagamihara (JP); Yukihide Inagaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,917

(22) Filed: Aug. 8, 2013

(65) Prior Publication Data
US 2014/0105217 A1    Apr. 17, 2014

Related U.S. Application Data

(63) Continuation of application No. 13/087,484, filed on Apr. 15, 2011, now Pat. No. 8,514,869, which is a continuation of application No. 12/560,485, filed on Sep. 16, 2009, now Pat. No. 7,983,283, which is a continuation of application No. 11/449,614, filed on Jun. 9, 2006, now Pat. No. 7,609,704, which is a continuation of application No. 10/093,525, filed on Mar. 11, 2002, now Pat. No. 7,092,392.

(30) Foreign Application Priority Data

Mar. 19, 2001    (JP) ................................. 2001-077585

(51) Int. Cl.
*H04L 12/28*    (2006.01)
*H04L 12/775*    (2013.01)
*H04L 12/46*    (2006.01)
*H04L 12/701*    (2013.01)
*H04L 12/933*    (2013.01)

(52) U.S. Cl.
CPC ............ *H04L 45/58* (2013.01); *H04L 12/4625* (2013.01); *H04L 45/00* (2013.01); *H04L 49/102* (2013.01)
USPC ........................................................ 370/401

(58) Field of Classification Search
USPC .......................... 370/351, 389, 392, 400–401
See application file for complete search history.

(56) References Cited

U.S. PATENT DOCUMENTS 5,434,863 A    7/1995 Onishi et al. .................. 370/402
5,463,621 A    10/1995 Suzuki et al. ................. 370/399

(Continued)

FOREIGN PATENT DOCUMENTS

JP    5199230    8/1993

OTHER PUBLICATIONS

Kent, et al "Network Working Group, Request for Comments": 2401, Nov. 1998, Security Protocol Architecture for the Internet Protocol.

*Primary Examiner* — Kerri Rose
(74) *Attorney, Agent, or Firm* — Brundidge & Stanger, P.C.

(57) ABSTRACT

A packet routing apparatus has a plurality of routing units, connected by a first connecting mechanism. The plurality of routing units comprise a first routing unit, connected to at least one port, and a second routing unit, connected to an extended function processor. The first routing unit transmits a packet, received from the port, to another first routing unit and/or a second routing unit. The second routing unit transmits the packet, received from the first connecting mechanism, to the extended function processor.

19 Claims, 18 Drawing Sheets

(56) References Cited

U.S. PATENT DOCUMENTS

| | | | |
|---|---|---|---|
| 5,490,252 A | 2/1996 | Macera et al. | 709/249 |
| 5,822,319 A | 10/1998 | Nagami et al. | 370/392 |
| 5,978,844 A | 11/1999 | Tsuchiya et al. | |
| 5,982,296 A | 11/1999 | Wakasa et al. | 370/392 |
| 6,112,248 A | 8/2000 | Maciel et al. | 709/238 |
| 6,122,285 A | 9/2000 | Okada | 370/450 |
| 6,385,657 B1 | 5/2002 | Parady | 370/223 |
| 6,496,510 B1 | 12/2002 | Tsukakoshi et al. | 370/401 |
| 6,604,147 B1 | 8/2003 | Woo | 709/240 |
| 6,611,522 B1 | 8/2003 | Zheng et al. | 370/395.21 |
| 6,704,794 B1 | 3/2004 | Kejriwal et al. | 709/236 |
| 6,724,769 B1 | 4/2004 | Sang | 370/429 |
| 6,771,662 B1 | 8/2004 | Miki et al. | 370/469 |
| 7,068,656 B2 | 6/2006 | Sainomoto et al. | |
| 7,092,392 B2 | 8/2006 | Yoshino et al. | |
| 7,177,310 B2 | 2/2007 | Inagaki et al. | |
| 7,609,704 B2 | 10/2009 | Yoshino et al. | |
| 7,983,283 B2 | 7/2011 | Yoshino et al. | |
| 8,514,869 B2 | 8/2013 | Yoshino et al. | |
| 2002/0083344 A1 | 6/2002 | Vairavan | |
| 2010/0002713 A1 | 1/2010 | Yoshino et al. | |
| 2011/0194565 A1 | 8/2011 | Yoshino et al. | |

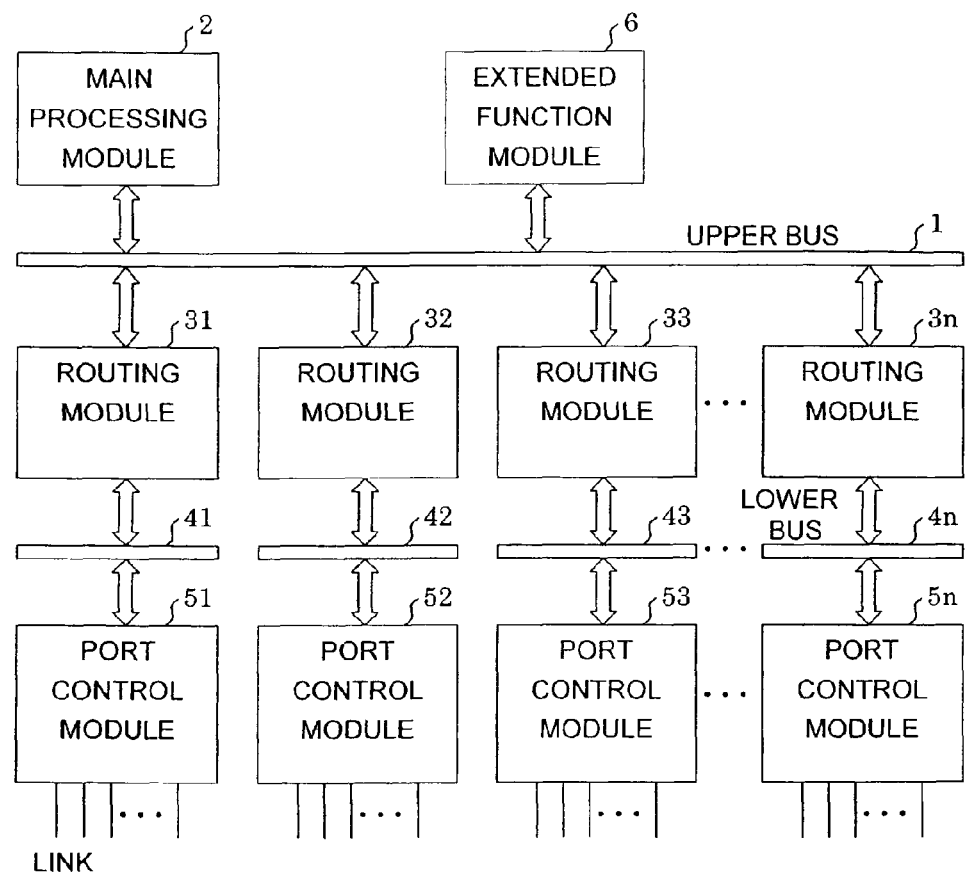
F I G. 1

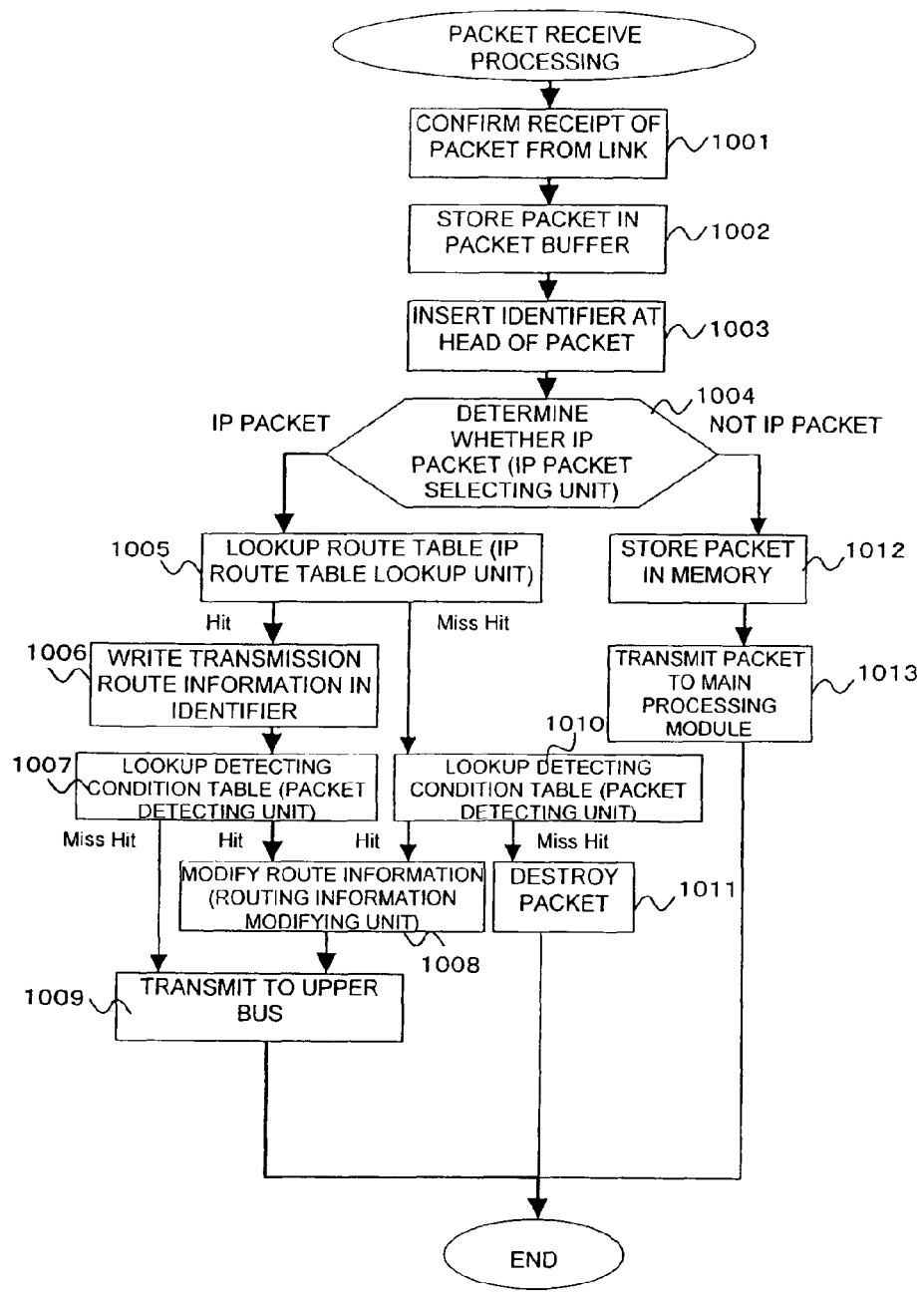
F I G. 8

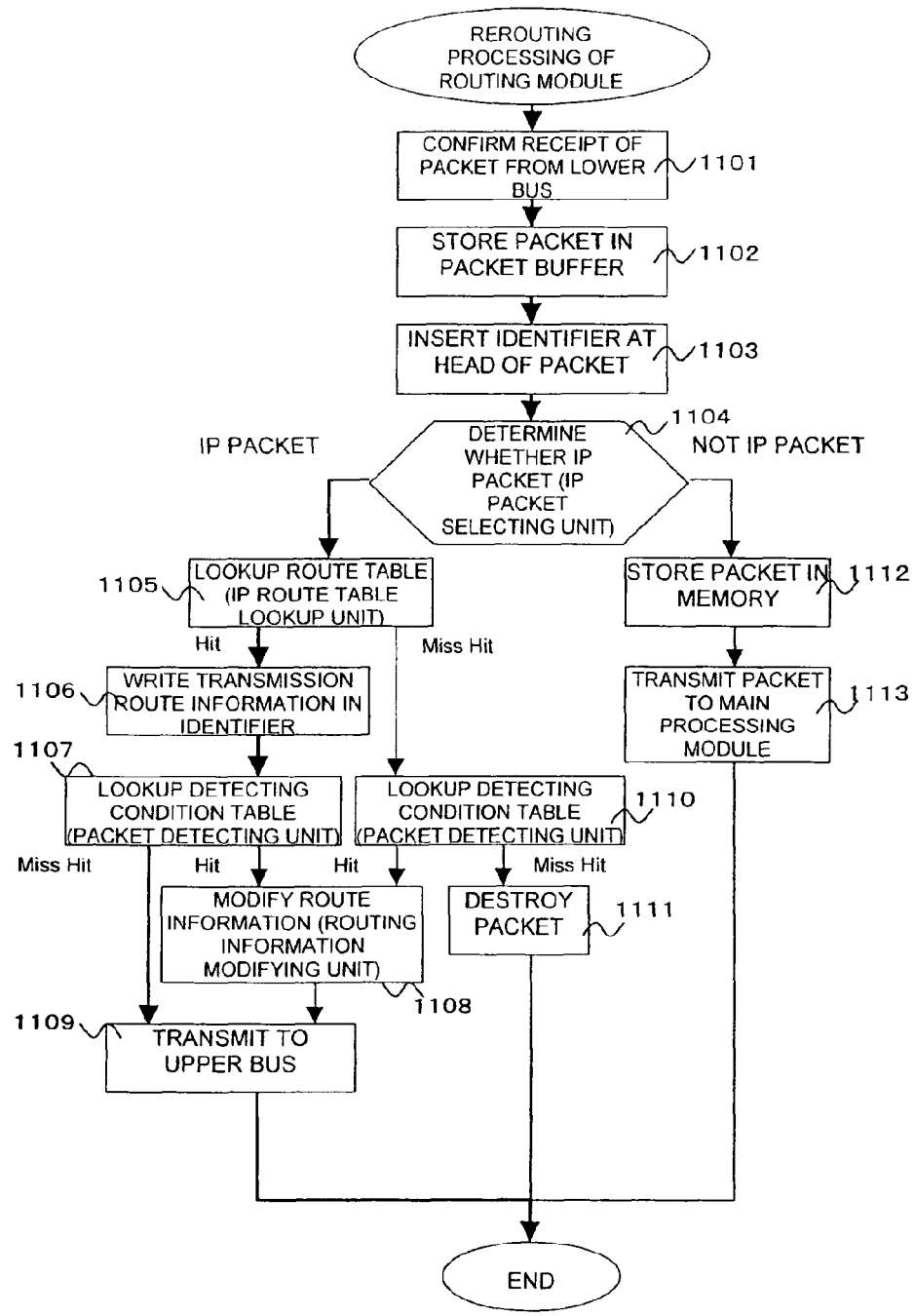
F I G. 1 1

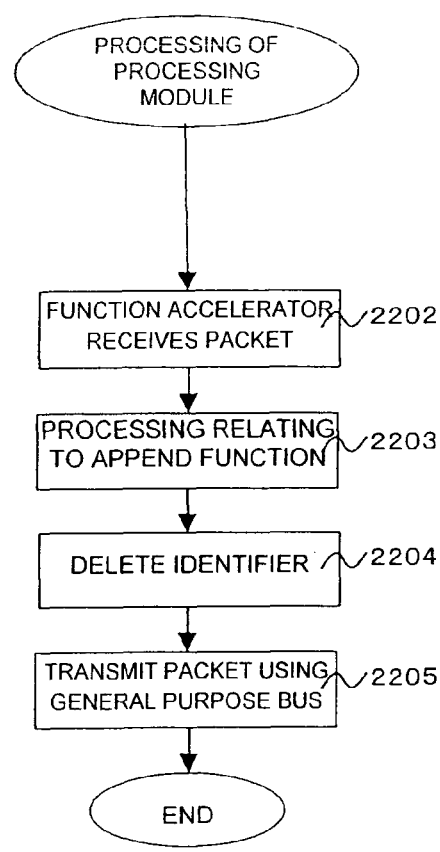
F I G. 1 5

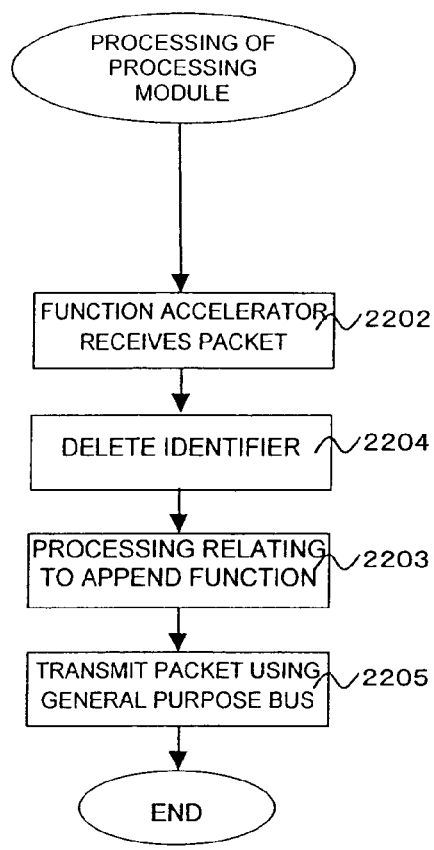
F I G. 20

PACKET ROUTING APPARATUS

CROSS-REFERENCE TO RELATED APPLICATION

The present application is a continuation application of Ser. No. 13/087,484, filed Apr. 15, 2011, now U.S. Pat. No. 8,514,869; which is a continuation of application Ser. No. 12/560,485, filed Sep. 16, 2009, now U.S. Pat. No. 7,983,283; which is a continuation of application Ser. No. 11/449,614, filed Jun. 9, 2006, now U.S. Pat. No. 7,609,704; which is a continuation of application Ser. No. 10/093,525, filed Mar. 11, 2002, now U.S. Pat. No. 7,092,392, the contents of which are incorporated herein by reference. The present application is also related to "INTERNETWORKING APPARATUS FOR CONNECTING PLURAL NETWORK SYSTEMS AND COMMUNICATION NETWORK SYSTEM COMPOSED OF PLURAL NETWORK SYSTEMS MUTUALLY CONNECTED", by K. Onishi et al, Ser. No. 09/935,919, filed Aug. 27, 1992, now U.S. Pat. No. 5,434,863; "A PACKET ROUTING APPARATUS AND A METHOD OF ROUTING A PACKET" by Y. Sainomoto et al, Ser. No. 10/093,527, filed Mar. 11, 2002 claiming priority on Japanese patent application No. 2001-077607; "NETWORK CONNECTION APPARATUS", by Y. Inagaki et al, Ser. No. 10/093,526, filed Mar. 11, 2002 claiming priority to Japanese patent application No. 2001-067954, the contents of which are each incorporated herein by reference.

BACKGROUND OF THE INVENTION

The present invention relates to a packet routing apparatus and a packet routing method. More particularly, this invention relates to the packet routing apparatus and packet routing method incorporating an extended function module, such as a router, a LAN switch, and the like. A bridge is an apparatus for connecting a plurality of networks, mutually connecting at a data link layer of a network system hierarchy, and controlling the relay according to an MAC address in the packet. A router connects at a network layer, which is the upper layer of the data link layer, and carries out relay according to an IP address in the packet.

For example, U.S. Pat. No. 5,434,863 (corresponding Japanese Patent Publication Laid-Open Patent Application No. 10 5-199230) discloses a router.

FIG. 18 shows a block diagram of the router disclosed in the above application. This router comprises a main processing module 2, routing modules 31 to 3n, an upper BUS 1, lower BUS 41 to lower BUS 4n, and line control modules 51 to 5n. The router controls protocols, the number of protocols matching the number of network layers. The routing flow of the router will be explained using an IP (Internet Protocol) protocol as a representative example.

When a packet is received from a communication line, the port control module 51 sends the packet via the lower BUS 41 to the routing module 31. The routing module 31 retrieves route information, held by itself, based on the IP address in the received packet, selects a predetermined route or an optimum route, and selects for example, the routing module 32. The routing module 31 relays the received packet via the upper BUS 1 to the selected routing module 32. The routing module 32 extracts the packet from the upper BUS 1, and sends it via the lower BUS 42 to the port control module 52. The packet is transmitted from the port control module 52 to the destination communication line. Conversely, when transmitting the packet from the port control module 52 to the port control module 51, the packet is routed along a route which is the reverse of that described above.

The patent application mentioned above discloses one example of a supplementary processor for executing various functions in a router of this type. In this example, the supplementary processor for supplementing the functions of the main processing module is connected to the upper BUS.

SUMMARY OF THE INVENTION

A bridge and a router are apparatuses for relaying packets. For example, in relaying a packet, a network operator activates functions of these apparatuses to perform extended functions, such as detecting data in the packet and working the packet.

In an apparatus capable of scalable extension and comprising multiple extended function modules for performing extended functions, the fact that multiple routing modules can be provided in a router is utilized by replacing some of the routing modules with extended function modules. In this case, the extended function modules are controlled as a unit connected to the same coupling mechanism as the routing modules. When a packet having new address information has been created by packet data work performed by an extended function module, the next routing destination must be recalculated; consequently, the extended function modules have the same routing functions as the routing modules.

However, when using the supplementary processor, disclosed as an extended function module in the application mentioned above, the supplementary processor has slow processing speed, since routing is processed by using software. A drawback of slow routing is that the relay speed of the packet becomes slower.

The present invention addresses the above points, and provides a packet routing apparatus which one or multiple extended function modules are mounted in, the extended function modules being capable of high-speed processing of appended functions and routing, and the packet routing apparatus being capable of scalable extended functions.

Furthermore, the present invention provides the packet routing apparatus, which performs high-speed processing by combining extended function processing modules with routing modules.

Furthermore, the present invention reduces development cost by realizing the functions of the extended function processing module without the routing module function.

Furthermore, the present invention makes the packet routing apparatus extendable by mounting the extended function, processing modules in a scalable formation. This invention also provides the packet routing apparatus comprising multiple extended function processing modules for realizing the same or different functions, wherein processing can be carried out by distributing the load among the multiple extended function processing modules.

In the packet routing apparatus according to the present invention, a high-speed routing module which is capable of routing processing using hardware, is connected to an extended function processing module which executes extended functions, thereby forming an extended function module. Consequently, even when the extended function processing module has performed packet data work to create a packet having new address information, the routing module, which is connected to the extended function processing module, selects a new route for the packet, and transmits the packet on that route.

The specifications of the specific constitution of the extended function module will be explained.

(1) The extended function module comprises a high-speed routing module, used in the packet routing apparatus, and an extended function processing module, connected under the control of the routing module. According to this constitution, when the extended function module executes a routing function, the high-speed routing module is used in its unchanged form. This makes it possible to realize a high-speed extended function module within minimal adaptation.

According to (1), for example in the constitution of FIG. 18, extended function processing modules are connected to the routing module instead of the port control modules.

(2) As in (1), the extended function processing module is connected to the routing module. However, a new interface is provided for the routing module. This interface is different from the interface which the port control module is connected to. Consequently, the extended function processing module connects to the interface. This makes it possible to realize a high-speed extended function module within minimal adaptation.

(2) The following two constitutions are possible.

(i) A general purpose BUS or special interface line is extracted from the routing module, and one or multiple extended function processing modules are connected to the line. The port control module is removed from the routing module.

(ii) A general purpose BUS or special interface line is extracted from the routing module, and the extended function processing module is connected to the line. The port control module also connects to the routing module. In the constitution of (i), the routing module switches between a plurality of extended function processing modules. In the constitution of (ii), the routing module divides usage both the extended function module and the port control module in accordance with an identifier, appended to the packet.

(3) In the constitutions of (1) or (2), a plurality of extended function processing modules are mounted in each routing module.

(4) The extended function processing module is incorporated inside the routing module, forming an extended function module on a single board.

The packet routing apparatus of the present invention comprises a first coupling mechanism, and a plurality of routing units, connected to the first coupling mechanism. The routing units are connected to different second coupling mechanisms. The second coupling mechanisms are connected to different port controllers and extended function processing units. An extended function processing unit is connected to at least one of the second coupling mechanisms. Each of the port controllers connects to at least one link (port), and receives a packet from the link (port) and transmits the packet to the second coupling mechanism. Furthermore, each of the port controllers receives a packet from the second coupling mechanism, and transmits the packet to one of the links (ports). The extended function processing unit receives the packet from the second coupling mechanism, executes a predetermined append function to the packet, and transmits the packet to the second coupling mechanism. The plurality of routing units comprises a plurality of first routing units, which are connected to one of the port controllers via one of the second coupling mechanisms, and at least one second routing unit, which is connected to the extended function processing unit via the second coupling mechanism. When the first routing units and the second routing units have received a packet from the second coupling mechanism, they transmit the packet to the first coupling mechanism with another of the first routing units or another of the second routing units as a destination. When the first routing units and the second routing units have received a packet from the first coupling mechanism, they transmit the packet to the second coupling mechanism.

In the packet routing apparatus according to the present invention, the second routing unit may be connected to the extended function processing unit by a third coupling mechanism. In this case, the second routing unit may connect to a port controller via the second coupling mechanism.

BRIEF DESCRIPTION OF THE DRAWINGS

FIG. 1 is a block diagram of a router wherein an extended function module is connected to an upper BUS;

FIG. 8 is a flowchart showing a packet processing sequence in a receive-side routing module;

FIG. 11 is a flowchart showing a packet processing sequence of a routing module when rerouting;

FIG. 15 is a flowchart showing a packet processing sequence in an extended function processing module;

FIG. 20 is a flowchart showing another packet processing sequence in the extended function processing module shown in FIG. 13.

DETAILED DESCRIPTION OF THE EMBODIMENTS

An embodiment of the present invention will be explained with reference to the drawings.

The following explanation mainly describes routing processing of a packet routing apparatus. The packet routing apparatus is explained as a router. The packet routing apparatus may, of course, be an apparatus other than a router.

FIG. 1 is a block diagram of a router wherein an extended function module is connected to an upper BUS. In this router, an extended function module 6 is connected to the upper BUS 1, which connects a plurality of routing modules 51 to 5n.

Figure 2:
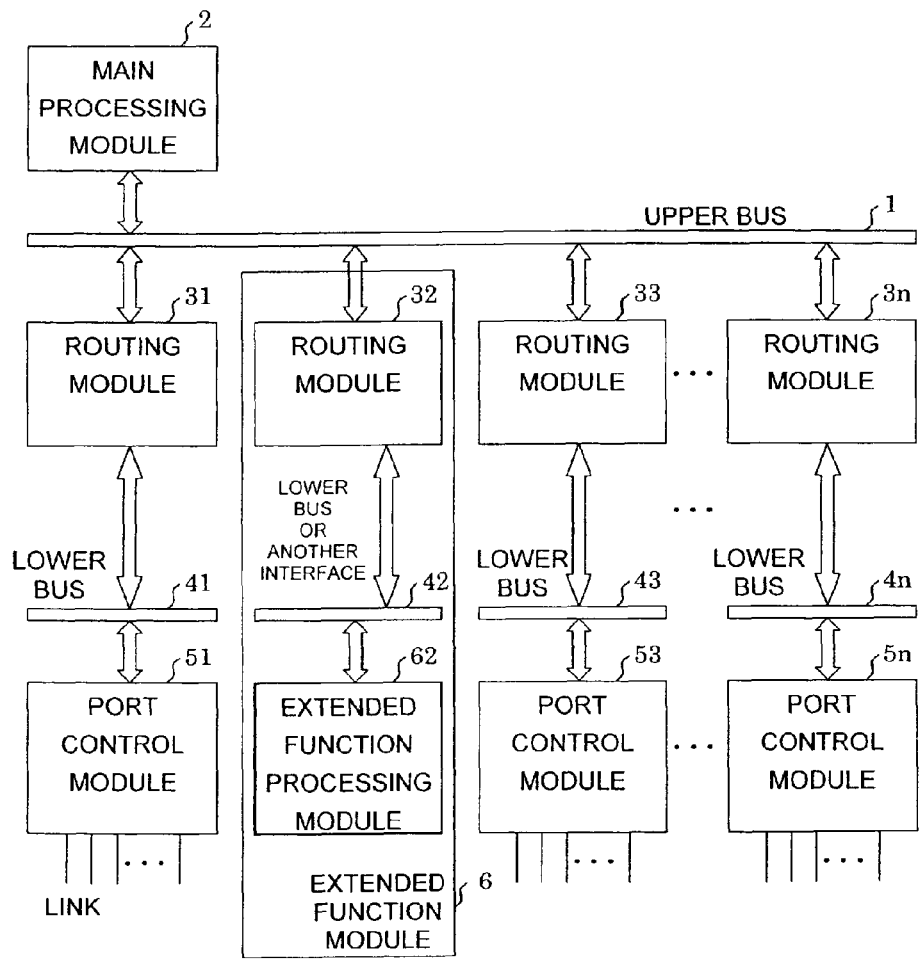
FIG. 2 is a schematic block diagram showing a router of an embodiment.

FIG. 2 is a schematic block diagram showing a router of an embodiment. In this router, an extended function module comprises a routing module and an extended function processing module, connected thereto.

In FIG. 2, the router comprises the upper BUS 1, a main processing module 2, an extended function module 6, a routing module 31, routing modules 33 to 3n, a lower BUS 41, lower BUS 43 to lower BUS 4n, a port control module 51, and port control modules 53 to 5n. The extended function module 6 comprises a routing module 32, a lower BUS 42 or another interface, and an extended function processing module 62.

The upper BUS 1 is a high-speed coupling mechanism, and has a switching structure or BUS structure. Specifically, the upper BUS 1 may comprise a crossbar switch or a BUS. The main processing module 2 for managing the overall apparatus and creating/distributing routing tables is connected to the upper BUS 1. Furthermore, one or multiple routing modules 31 to 3n for routing packets at high-speed is/are connected to the upper BUS 1. A lower BUS 41 for connecting to the port control module 51 is provided at the lower side of the routing module 31. The lower BUS 41 is an interface for transmitting packet data and other information from the routing module 31. The port control module 51 is a communication controller which controls protocols of the LAN and port, and communicates with an external network. The extended function processing module 62 executes new functions which cannot be processed by the main processing module 2 or the routing modules 31 and 33 to 3n. The extended function processing module 62 is a mechanism for high-speed processing of functions which are processed at low-speed by the main processing module 2. The extended function processing module 62 connects to the routing module 32 via the lower BUS 42 or another interface.

When connecting an extended function processing module to a routing module, two types of constitution may be envisaged. In one constitution, the extended function processing module is connected instead of aport control module via the routing module lower BUS. In another constitution, the extended function processing module is connected to the routing module via an interface which is different from the lower BUS which the port control module is connected to. These two constitutions will be explained in sequence.

Firstly, a case will be explained in which the extended function processing module 62 is connected instead of the port control module to a connector of the lower BUS 42 at the lower side of the routing module 32. According to this constitution, the extended function processing module 62 can be connected without updating the hardware of the routing module 32 in any way. In an actual apparatus, for example, the routing module 32 and the extended function processing module 62 are both mounted on one board, and are connected by the lower BUS.

According to this constitution, the high-speed routing module 32 can be used, enabling packets to be transmitted at high speed between the extended function processing module 62 and the upper BUS 1.

Figure 3:
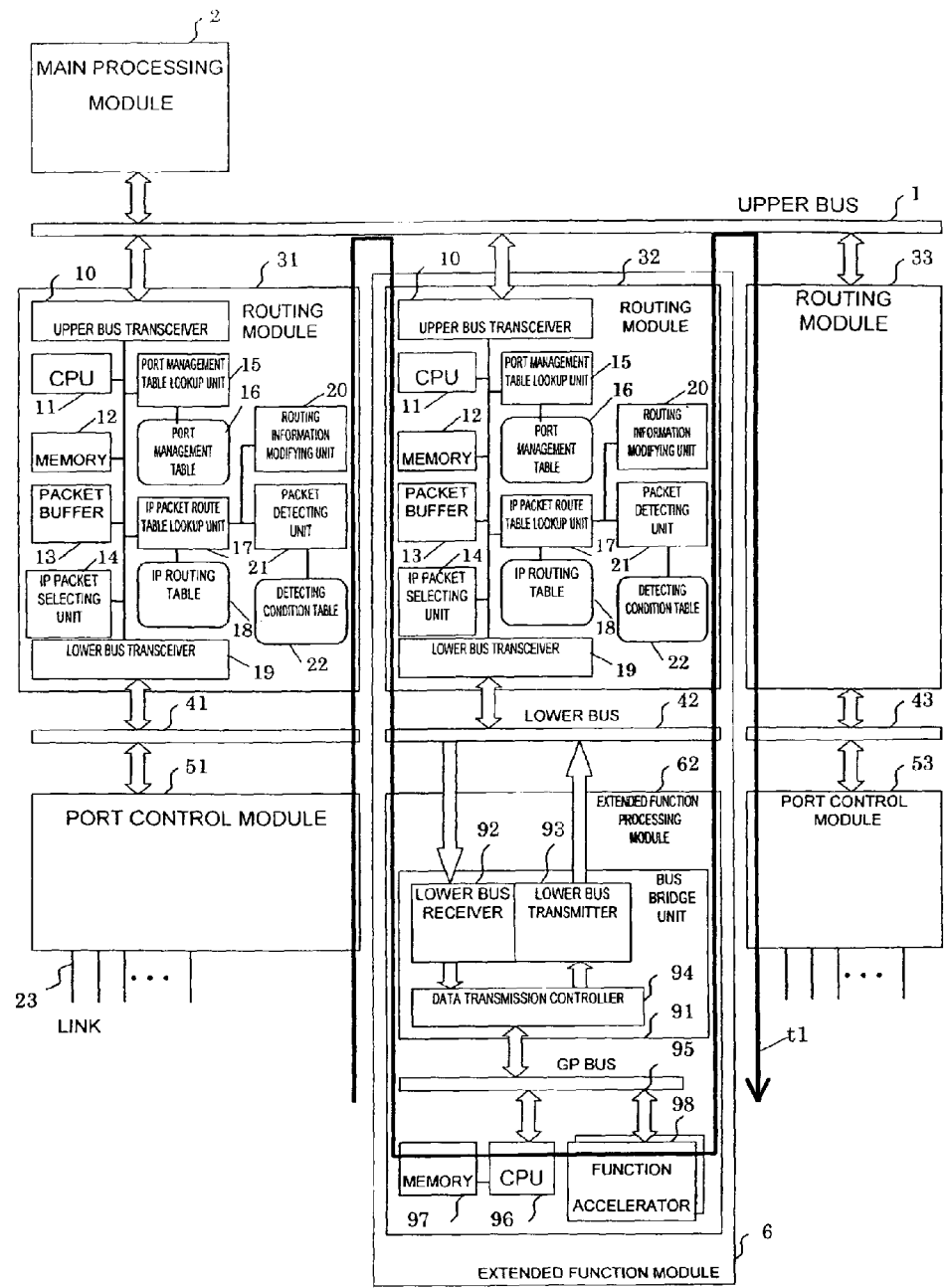
FIG. 3 is a detailed block diagram of a router.

FIG. 3 is a detailed block diagram showing the above constitution.

In FIG. 3, the extended function module 6 has a constitution which processes complex protocols by means of software, and comprises the extended function processing module 62, which a constitution for high-speed processing by hardware is mounted on. The extended function processing module 62 comprises a general purpose (GP) BUS 95, a BUS bridge unit 91, a CPU 96 which is connected to the GP BUS 95, a memory 97 for the CPU 96, and one or multiple function accelerators 98 which connect to the GP BUS 95. The BUS connector 91 transmits packet data and other information between the lower BUS 42 and the GP BUS 95, acting as a connecting bridge therebetween. The BUS connector 91 comprises a lower BUS receiver 92, a lower BUS transmitter 93, and a data transmission controller 94.

Numbers, which are unique within the router, are allocated to the modules 31, 32, and 33. These numbers are termed "module numbers". There are cases where multiple port control modules and extended function processing modules are connected to each routing module. For this reason, numbers, which are unique within the routing module, are allocated to the port control modules 51 and 53 and the extended function processing module 62. These numbers are termed "physical port control module numbers". Numbers, which are unique within the all the port control modules, are allocated to the links (ports) 23 which connect to the port control module 51. Similarly, numbers which are unique within the all the port control modules are allocated to the links 23 which connect to the port control module 53. These numbers are termed "physical link numbers". A logical link number, used only in the router, may also be provided in correspondence with the physical link number. The logical link numbers and physical link numbers need not correspond in a one-to-one arrangement. For example, in the case of an ATM link, a plurality of virtual connections can be set at one ATM link. Hereinafter, this logical link number will be simply termed "link number". In the following explanation, a routing module accommodating a link 23 which has received a packet will be termed "receive side routing module", and a routing module accommodating a link 23 which has transmitted a packet will be termed "transmitting side routing module".

The routing modules 31, 32, and 33 have the same constitution. Each routing module comprises an upper BUS transceiver 10, a CPU 11, a memory 12, a packet buffer 13, an IP packet selecting unit, a port management table lookup unit 15, a port management table 16, an IP packet route table lookup unit 17, an IP routing table 18, a lower BUS transceiver 19, a routing information modifying unit 20, a packet detecting unit 21, and a detecting condition table 22.

The lower BUS transceiver 19 handles packets which are transmitted and received via the lower BUS. The lower BUS transceiver 19 stores a packet, received from the lower BUS, in a packet buffer 13. At that time, the lower BUS transceiver 19 appends an identifier to the head of the packet. The identifier is used for transmitting relay information relating to the packet during transmission between modules within the same router.

Figures 4, 5:
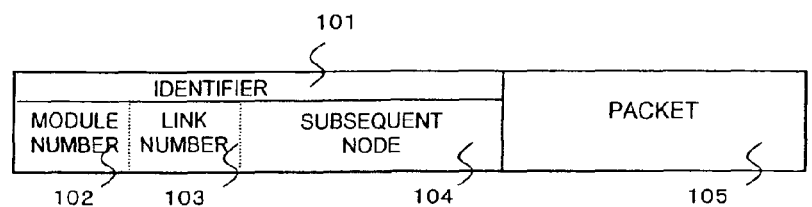
FIG. 4 shows one example of a format for inserting an identifier to a packet.
FIG. 5 shows one example of the constitution of a routing table.

FIG. 4 is a diagram showing one example of a format for inserting an identifier to a packet. The identifier 101 for the packet 105 comprises, for example, a module number 102, a link number 103, and a subsequent IP address 1 04, as transmission route information. A module number, a link number, and a subsequent IP address are obtained by looking them up in a routing table, explained later, and are stored in each field of the module number 102, the link number 103, and the subsequent IP address 104. The transmitting side routing module consults the identifier 101 and transmits the packet to the corresponding link 23.

Incidentally, although the term "identifier" is used in this embodiment, the term "header" or "label" may be used. Also, the format of the identifier is not limited to that shown in FIG. 4.

The identifier 101 is deleted by the port control module, which is connected to the transmitting side routing module. As another example, in order to reduce the amount of transmitted data in the packet, the transmitting side routing module may delete the identifier 101 immediately prior to transmitting the packet to the port control module.

On the other hand, when the extended function processing module 62 has executed the append function, the extended function processing module 62 deletes the identifier 101 to enable the routing module 32 to reroute the packet. Alternatively, the lower BUS transceiver 19 of the routing module 32 may delete the identifier 101 immediately prior to transmitting the packet to the extended function processing module 62. Then, when the lower BUS transceiver 19 of the routing module 32 stores the packet, which was received from the lower BUS 42, in the packet buffer 13, the lower BUS transceiver 19 appends a new identifier 101 at the head of the packet. In another example, the extended function processing module 62 does not delete the identifier 101. When the lower BUS transceiver 19 of the routing module 32 stores the packet, which was received from the lower BUS 42, in the packet buffer 13, the lower BUS transceiver 19 may write a new identifier 101 over the identifier 101 which is appended to the packet.

FIG. 5 shows one example of the constitution of a routing table. The routing table 18 has a plurality of entries. As shown in FIG. 5, transmission route information of the IP packet comprising a module number 203, a link number 204, a subsequent IP address 205, a destination IP address 201, and a subnet mask 202, are stored in correspondence with each other in each entry.

The module number 203 is the number of the transmitting side routing module which accommodates the link 23 directly connecting, or indirectly connecting, to the network which transmits the IP packet. The link number 204 is the number of the link 23 directly connecting, or indirectly connecting, to the network which transmits the IP packet. The subsequent IP address 205 is the IP address representing the apparatus which will relay the IP packet subsequent to this router.

The IP packet route table lookup unit 17 retrieves data from the routing table 18. In retrieving the data, the IP packet route table lookup unit 17 uses the subnet mask 202, stored in one entry of the IP routing table 18, to extract the network address section of the destination IP address 201 of that entry. Furthermore, the IP packet route table lookup unit 17 uses the subnet mask 202 to extract the network address section from the destination IP address contained in the header to the IP of the IP packet, stored in the IP packet route table lookup unit 17. The IP packet route table lookup unit 17 compares the values of the two extracted network address sections, and determines whether they match. The IP packet route table lookup unit 17 continues to determine each entry of the routing table 18 until the two network address sections match. When the two network address sections match, the IP packet route table lookup unit 17 reads the transmission route information (module number 203, link number 204, subsequent IP address 205) stored in that entry.

Figure 6:
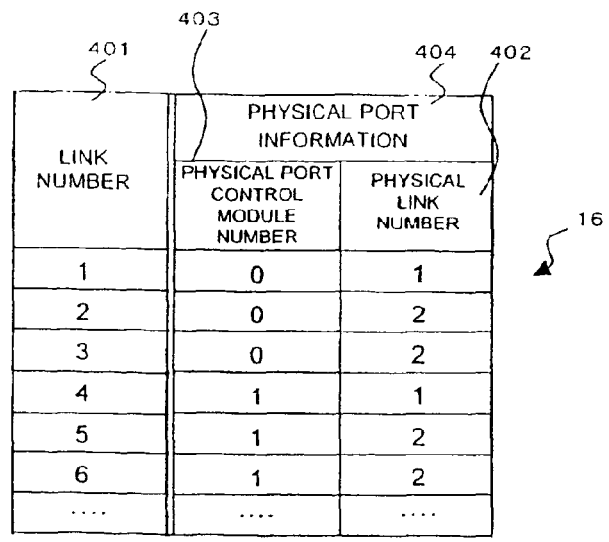
FIG. 6 shows one example of the constitution of a port management table.

FIG. 6 shows one example of the constitution of a port management table. The port management table 16 comprises a plurality of entries, and, as shown in FIG. 6, a link number 401 and physical port information 404 comprising a physical link number 402 and a physical port control module number 403, are stored in correspondence with each other in each entry.

When a packet is received from the upper BUS 1, the port management table lookup unit 15 looks up the link number 401 from the port management table 16 by using the link number 103, contained in the identifier 101 appended to the packet, as a lookup key. When the port management table lookup unit 15 locates an entry which stores a link number 401 matching the lookup key, the port management table lookup unit 15 obtains from that entry the physical port control module number 403 and the physical link number 402 of the link which is handing over the packet.

Figure 7:
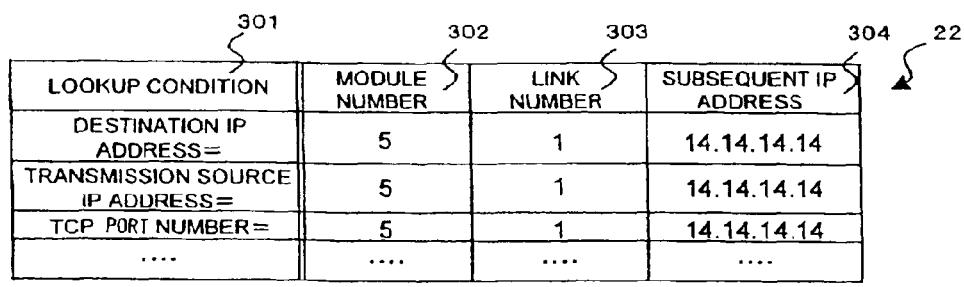
FIG. 7 shows one example of the constitution of a detecting condition table.

FIG. 7 shows one example of the constitution of a, lookup condition table. The lookup condition table 22 stores conditions for looking up an IP packet which will be the target of IP append function processing. The lookup condition table 22 contains a plurality of entries, and, as shown in FIG. 7, a lookup condition 301 for looking up the IP packet which will be the target of IP append function processing, a module number 302 of the extended function module 6 which executes the IP append function processing, a link number 303, and a subsequent IP address 304, are stored in correspondence with each other in each entry. The lookup condition 301 is, for example, a destination IP address or a source IP address. The lookup condition 301 m ay alternatively comprise, for example, protocol information above the IP layer, such as the link number of a TCP (transmission control protocol) or a UDP (user datagram protocol). Incidentally, it is acceptable to use only the module number 302 to identify the extended function module 6. When the extended function module 6 comprises a plurality of extended function processing modules, the packet can be allocated to each extended function processing module by using the link number 303 and the subsequent IP address 304.

The packet detecting unit 21 looks up an IP address contained in the IP packet, stored in the packet buffer 13, or the lookup condition 301 of the detecting condition table 22 as protocol information of an even higher layer. When the information contained in the packet matches one of the lookup conditions 301, the packet detecting unit 21 identifies the IP packet as one which is to be the target of IP append function processing, and extracts the module number 302 of the extended function module 6 performing the processing, the link number 303, and the subsequent IP address 304, from the entry which the matching lookup condition 301 is stored in.

When the IP packet which is to be the target of IP append function processing has been identified by the packet detecting unit 21, the routing information modifying unit 20 modifies the module number 202, the link number 203, and the subsequent IP address 304, obtained from the detecting condition table 22, into the information in the identifier 101 appended to the packet.

An IP packet selecting unit 14 determines whether the packet received by the lower BUS transceiver 19 via the lower BUS is an IP packet.

The packet buffer 13 stores the packet, received by the lower BUS transceiver 19 or by the upper BUS transceiver 10. The CPU 11 executes software, stored in the memory 12. This software executes functions such as managing the apparatuses in the routing module, and storing setting information and the like, transmitted from the main processing module 2, in the tables. The software also transmits packets other than IP packets to the main processing module 2.

The memory 12 stores various types of software, which are executed by the CPU 11. The memory 12 also stores the port management table 16, the routing table 18, and the detecting condition table 22, described above. That is, the data in the tables is stored in the memory 12. Therefore, the port management table lookup unit 15, the IP packet route table lookup unit 17, and the packet detecting unit 21 look up and read the data stored in the tables by accessing the memory 12.

The upper BUS transceiver 10 handles packets which are transmitted and received via the upper BUS 1. The upper BUS transceiver 10 transmits the packet via the upper BUS 1 in compliance with the module number 102, contained in the identifier 101 appended to the head of the packet.

Subsequently, the processing sequence of the router when a packet is received from one of the links 23, the extended function module 6 executes the IP append function to the packet, and the packet is transmitted again to one of the links 23, will be explained. The arrow line t1 shown in FIG. 3 represents the flow of the packet. The processing sequence of the router will be explained in the order of the flow of the packet.

FIG. 8 is a flowchart showing the packet processing sequence of the receive side routing module 13.

The port control module 51 confirms that the packet has been received from one of the links 23 (step 1001). The port control module 51 transmits the received packet to the lower BUS 41. The lower BUS transceiver 19 of the packet buffer 13 receives the received packet from the lower BUS 41, and stores it in the packet buffer 13 (step 1002). At this time, the lower BUS transceiver 19 appends an identifier 101 to the head of the packet and stores it in the packet buffer 13 (step 1003).

The IP packet selecting unit 14 determines whether the packet stored in the packet buffer 13 is an IP packet (step 1004). When the packet is an IP packet, the IP packet route table lookup unit 17 looks up the routing table 18 (step 1005). During the lookup, the IP packet route table lookup unit 17 uses the subnet mask 202, stored in one entry of the routing table 18, to extract the network address section from the destination IP address contained in the IP header of the IP packet. Using the subnet mask 202, the IP packet route table lookup unit 17 extracts the network address section from the destination IP address 201 of that entry. For example, the section from which bit to which other bit of the IP address, being used as the network address section, is determined according to the setting of the subnet mask 202. All or part of the IP address is determined and compared by using the subnet mask 202. The IP packet route table lookup unit 17 compares the values of the two extracted network addresses, and determines whether they match. The IP packet route table lookup unit 17 makes this determination for each entry of the routing table 18, and, when an entry where the two network address sections match (when the lookup is a hit) is found, the IP packet route table lookup unit 17 reads the transmission route information (module number 203, link number, 204, and subsequent IP address 205) from that entry.

The routing information modifying unit 20 stores the values of the module number 203, link number 204, and subsequent IP address 205, which have been read in each field of the identifier 101 appended to the IP packet (step 1006).

Then, the packet detecting unit 21 looks up the lookup condition 301 in the detecting condition table 22, comprising the IP address contained in the IP packet or protocol information from a higher layer (step 1007). When the packet detecting unit 21 finds a lookup condition 301 matching the information contained in the IP packet (when the lookup is a hit), the packet detecting unit 21 confirms that the IP packet is one which should be IP append function processed, and reads the module number 302 of the extended function module 6 which will perform the processing, the link number 203, and the subsequent IP address 304, from the entry with the matching lookup condition 301.

The routing information modifying unit 20 modifies and stores the module number 302, link number 303, and subsequent IP address 304, which have been read from the detecting condition table 22 by the packet detecting unit 21, in each field of the identifier 101 (step 1008). When the lookup was a mis-hit in step 1007, the packet detecting unit 21 ends the processing. Since the packet detecting unit 21 cannot read information such as the module number 302, the routing information modifying unit 20 performs no processing at this time.

Following the above processes, the upper BUS transceiver 10 transmits the IP packet, stored in the packet buffer 13, via the upper BUS 4 to the destination extended function module 6 in compliance with the module number 102 of the identifier 101, appended to the packet (step 1009).

When the lookup was a mis-hit in step 1005, the IP packet route table lookup unit 17 ends the processing. Since the IP packet route table lookup unit 17 cannot read the transmission route information, the routing information modifying unit 20 performs no processing at this time.

Subsequently, the packet detecting unit 21 looks up the detecting condition table 22 as in step 1007 (step 1010). When this lookup is a hit, as in step 1007, the packet detecting unit 21 reads the transmission route information comprising the module number 302 and the like, from the detecting condition table 22. In this case, the routing information modifying unit 20 executes step 1008 and stores the values read by the packet detecting unit 21 in the fields of the identifier 101. When the lookup in step 1010 was a mis-hit, the packet detecting unit 21 ends the processing. In this case, the routing module (1) 2 destroys the packet stored in the packet buffer 13 (step 1011) and ends the receive processing.

In step 1004, when the IP packet selecting unit 14 has determined that the packet is not an IP packet, the IP packet selecting unit 14 stores the packet in the memory 12, managed by the CPU 11 (step 1012). The software, executed by the CPU 11, transmits the packet via the upper BUS transceiver 10 and the upper bus 1 to the main processing module 2 (step 1013). The main processing module 2 receives the packet, identifies the type of the packet, and executes processing in accordance with that type. If the packet is one which needs to be relayed, the main processing module 2 executes a relay process. According to the above sequence of processes, the receive side routing module 2 is able to transmit the IP packet to be IP appended function processed to the extended function module 6.

Subsequently, the processing sequence in the extended function module 6 will be explained by using FIGS. 9 and 10.

Figure 9:
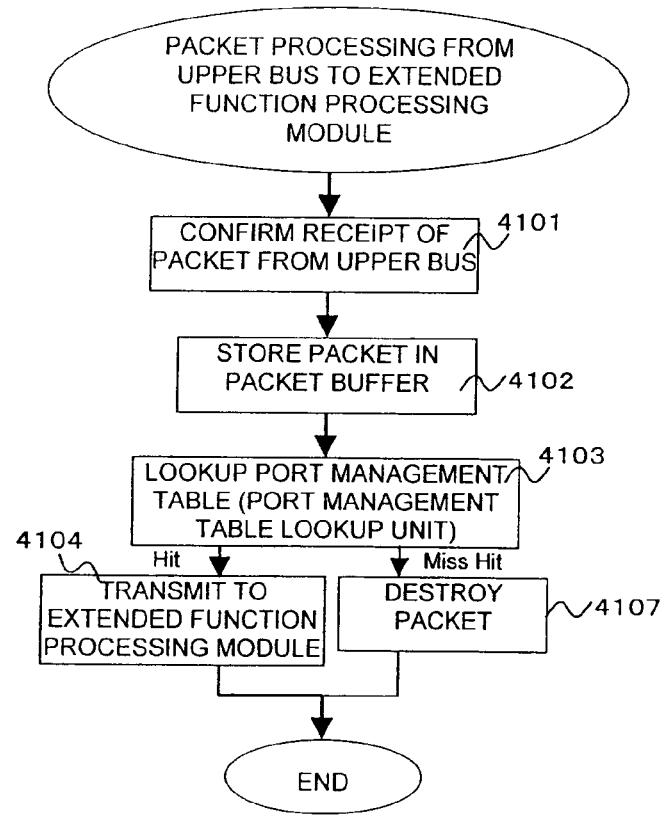
FIG. 9 is a flowchart showing a packet processing sequence in a routing module which is connected to an extended function processing module.

FIG. 9 is a flowchart showing the packet processing sequence of the routing module 32 in the extended function module.

The IP packet is transmitted from the routing module 31, and is received from the upper BUS 1 by the upper BUS transceiver 10 of the routing module 32. The upper BUS transceiver 1 0 consults the module number 102 of the identifier 101 appended to the IP packet, and confirms that this module was the intended destination of the received IP packet (step 4101). The upper BUS transceiver 10 stores the IP packet in a packet buffer 13 (step 4102). The port management table lookup unit 15 looks up the port management table 1 6, using the link number 1 03 contained in the identifier 101 of the IP packet as a lookup key (step 4103). When the port management table lookup unit 15 locates an entry which stores a link number 401 matching the lookup key (i.e. when the lookup is a hit), the port management table lookup unit 15 reads from that entry the physical port control module number 403 and the physical link number 402 of the link which is transmitting the IP packet. The lower BUS transceiver 19 identifies the extended function processing module 62 corresponding to the physical port control module number 403 which has been read. Then, the lower BUS transceiver 19 extracts the IP packet from the packet buffer 13 and transmits the IP packet to the lower BUS 42 (step 4104). The extended function module 6 may comprise a plurality of extended function processing modules 62, and execute a plurality of append functions. In this case, the extended function processing module 62 for handing over the packet is selected as appropriate based on the link number 103 contained in the identifier 101 of the packet. Further, when transmitting the IP packet to the lower BUS 42, the lower BUS transceiver 19 also transmits the physical port control module number 403 and the physical link number 402 to the lower BUS 42. Alternatively, the lower BUS transceiver 19 may append the physical port control module number 403 and the physical link number 402 to the IP packet as identifiers before transmitting the IP packet to the lower BUS 42.

When the lookup in step 4103 was a mis-hit, the port management table lookup unit 15 ends processing. Then, the routing module 33 destroys the IP packet stored in the packet buffer 13 (step 4107) and ends transmission processing.

Figure 10:
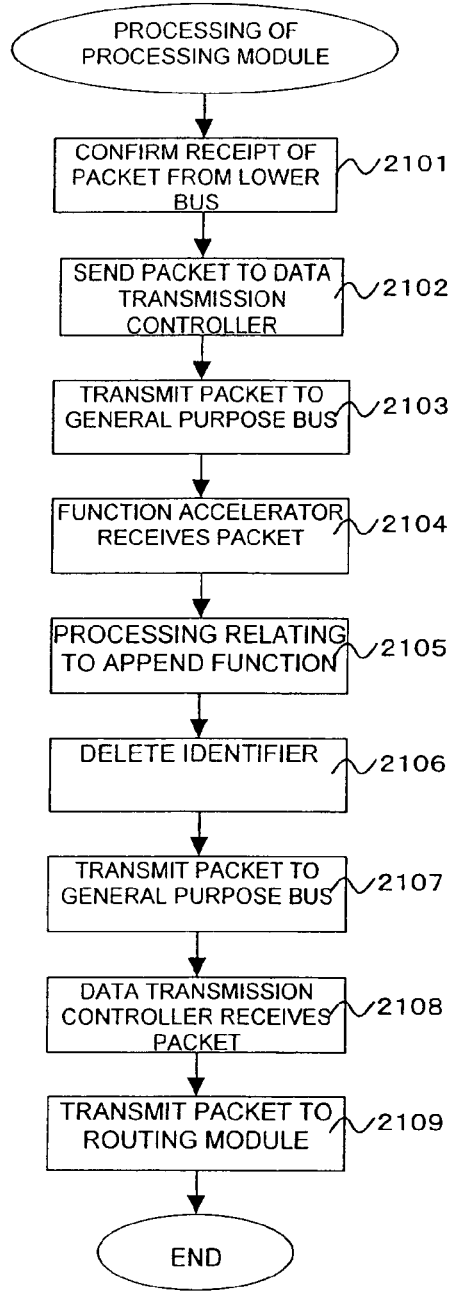
FIG. 10 is a flowchart showing a packet processing sequence in an extended function processing module.

FIG. 10 is a flowchart showing a packet processing sequence of the extended function processing module 62.

The IP packet is output from the routing module 32, and received from the lower BUS 42 by a lower BUS receiver 92 of the extended function processing module 62. The lower BUS receiver 92 consults the physical port control module number 403, which was received from the routing module 32 together with the IP packet, and confirms that this module was the intended destination of the received IP packet (step 2101). The lower BUS receiver 92 transmits the IP packet to the data transmission controller 94 (step 2102). The data transmission controller 94 transmits the received IP packet to the GP (general purpose) BUS 95 (step 2103). The function accelerator 98 receives the IP packet from the GP BUS 95 (step 2104).

Incidentally, the extended function processing module may comprise a plurality of function accelerators 98, and execute a plurality of append functions. In this case, each of the function accelerators 98 can confirm that an IP packet has been received by itself based on the physical link number 402 or the physical port control module number 403, which were transmitted from the BUS connector 91 together with the IP packet. The extended function processing module 62 may comprise a plurality of function accelerators 98 which execute the same append function. In this case, for example, the data transmission controller 94 uses the value of the physical link number 402 and the value of the physical port control module number 403, received from the routing module 32, to select one of the function accelerators 98, and transmits the packet. Furthermore, any one of the plurality of function accelerators 98 may receive the IP packet based on the value of the physical link number 402 and the value of the physical port control module number 403, received from the routing module 32. This enables the extended function processing module 62 to spread processing among the plurality of function accelerators 98.

The function accelerators 98 execute processing relating to append functions for the IP packet (step 2105).

The append functions carried out here include, for example, an IP sec function (described in RFC (request for comment) 2401) which codes the packet at the IP layer in order to construct a VPN (virtual private network), an NAT (network address translator) function (described in RFC 1631, RFC 2391, and RFC 2663) which relatively converts a private IP address and a global IP address in order to construct a private network, a server load balancing function seamlessly use a plurality of servers by presenting the plurality of servers to a client as single IP address, a filtering function which detects unauthorized packets (described in RFC 2267), and the like. Some of these functions are standardized by a standardizing body, the IETF (Internet Engineering Task Force), and are publicized under the name of RFC.

After completing the processing, the function accelerator 98 deletes the identifier 101 appended to the packet (step 2106), and transmits the packet to the GP BUS 95 (step 2107). The data transmission controller 94 receives the packet from the GP BUS 95 (step 2108). The data transmission controller 94 hands the packet to the lower BUS transmitter 93. The lower BUS transmitter 93 transmits the received packet to the lower BUS 42 (step 2109).

Figure 19:
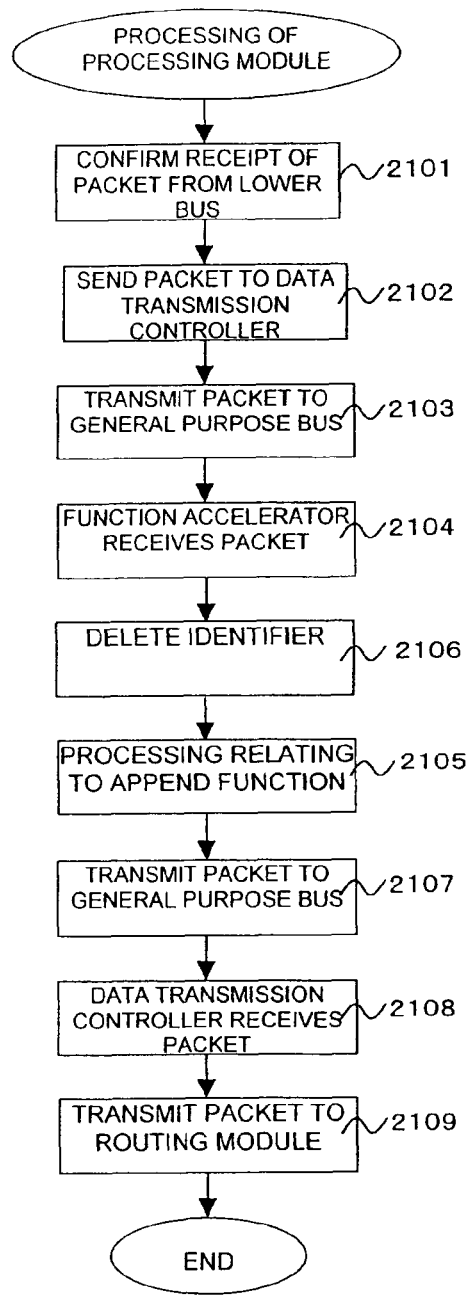
FIG. 19 is a flowchart showing another packet processing sequence of the extended function processing module shown in FIG. 3.

For example, when executing an IP sec function in the tunneling mode, the function accelerator 98 appends a new IP header to the head of the IP packet, and creates a new IP packet. When coding the IP packet, the function accelerator 98 codes only the original IP packet without the identifier 101. Therefore, in such a case, the function accelerator 98 can delete the identifier 101 (step 2106), and thereafter perform processing relating to append functions (step 2105). FIG. 19 is a flowchart showing the packet processing sequence of the extended function processing module 62 in this case.

As described above, when the lower BUS transceiver 19 of the routing module 32 deletes the identifier 101 immediately prior to transmitting the IP packet to the extended function processing module 62, the function accelerator 98 need not delete the identifier 101. Therefore, step 2106 is not necessary. Furthermore, when the lower BUS transceiver 19 of the routing module 32 stores the IP packet, received from the lower BUS 42, in the packet buffer 13, the lower BUS transceiver 19 rewrites a new identifier 101 over the identifier 101 appended to the packet; similarly, in this case, the function accelerator 98 does not need to delete the identifier 101.

FIG. 11 is a flowchart showing a packet processing sequence of the routing module 32 when rerouting.

The lower BUS transceiver 19 of the routing module 32 receives the packet from the lower BUS 42 (step 1101) and stores it in the packet buffer 13 (step 1102). At this time, the lower BUS transceiver 19 appends an identifier 101 to the head of the packet, and stores in the packet in the packet buffer 13 (step 1103). The IP packet selecting unit 14 determines whether the packet stored in the packet buffer 13 is an IP packet (step 1104). When the packet is an IP packet, the IP packet route table lookup unit 17 looks up the routing table 18 (step 1105). In looking up, the IP packet route table lookup unit 17 uses a sub net mask 202, stored in one entry of the routing table 18, to extract the network address section from the destination IP address, contained in the IP header of the IP packet. The IP packet route table lookup unit 17 uses the sub net mask 202 to extract the network address section from the destination IP address 201 of that entry. For example, the section from which bit to which other bit of the IP address, being used as the network address section, is determined according to the setting of the subnet mask 202. All or part of the IP address is determined and compared by using the subnet mask 202. The IP packet route table lookup unit 17 compares the values of the two extracted network address sections, and determines whether they match. The IP packet route table lookup unit 17 continues to determine each entry of the routing table 18 until two network address sections match. When an entry where two network address sections match is located, the IP packet route table lookup unit 17 reads the transmission route information (module number 203, link number 204, and subsequent IP address 205) from that entry.

The routing information modifying unit 20 stores the values of the read module number 203, link number 204, and subsequent IP address 205, in each field of the identifier 101 which is appended to the IP packet (step 1106).

Then, the packet detecting unit 21 looks up the lookup condition 3 01 in the detecting condition table 22, comprising the IP address contained in the IP packet or protocol information from a higher layer (step 1107). This IP packet is already being processed by the extended function processing module 62. For this reason, unless there is a need for further processing by another extended function module, the lookup by the packet detecting unit 21 in step 1107 is unsuccessful. Therefore, the packet detecting unit 21 ends the processing. Thereafter, the upper BUS transceiver 10 reads the IP packet stored in the packet buffer 13, and transmits the IP packet via the upper BUS 1 to the destination routing module 33 in compliance with the module number 102 of the identifier 101, appended to the IP packet (step 1109).

On the other hand, in step 1107, when the packet detecting unit 21 finds a lookup condition 301 matching the information contained in the IP packet (when the lookup is a hit), the packet detecting unit 21 confirms that the IP packet is one which should be IP append function processed, and reads the module number 302 of the extended function module which will perform the processing, the link number 303, and the subsequent IP address 304, from the entry with the matching lookup condition 301.

The routing information modifying unit 20 modifies and stores the module number 302, link number 303, and subsequent IP address 304, which have been read from the detecting condition table 22 by the packet detecting unit 21, in each field of the identifier 101 (step 1108). The upper BUS transceiver 10 transmits the IP packet, stored in the packet buffer 13, via the upper BUS 1 to another extended function module at the destination in compliance with the module number 102 of the identifier 101, appended to the packet (step 1109).

When the lookup in step 1105 was a mis-hit, the IP packet route table lookup unit 17 ends the processing. Since the IP packet route table lookup unit 17 cannot read the transmission route information, the routing information modifying unit 20 performs no processing at this time.

Subsequently, the packet detecting unit 21 looks up the detecting condition table 22 as in step 1107 (step 1110). When this lookup is a hit, as in step 1107, the packet detecting unit 21 reads the transmission route information comprising the module number 302 and the like, from the detecting condition table 22. In this case, the routing information modifying unit 20 executes step 1108 and stores the values read by the packet detecting unit 21 in the fields of the identifier 101 When the lookup in step 1110 was a mis-hit, the packet detecting unit 21 ends the processing. In this case, the routing module 32 destroys the packet stored in the packet buffer 13 (step 1111) and ends the receive processing.

Incidentally, when the extended function processing module 62 has converted the IP packet to a packet which is not an IP packet, in step 1104, the IP packet selecting unit 14 determines that the packet is not an IP packet. In this case, the IP packet selecting unit 14 stores the packet in the memory 12, managed by the CPU 11 (step 1112). The software, executed by the CPU 11, transmits the packet via the upper BUS transceiver 10 and the upper bus 1 to the main processing module 2 (step 1113). The main processing module 2 receives the packet, identifies the type of the packet, and processes the packet in accordance with its type. If the packet is one which needs to be relayed, the main processing module 2 executes relay processing.

Figure 12:
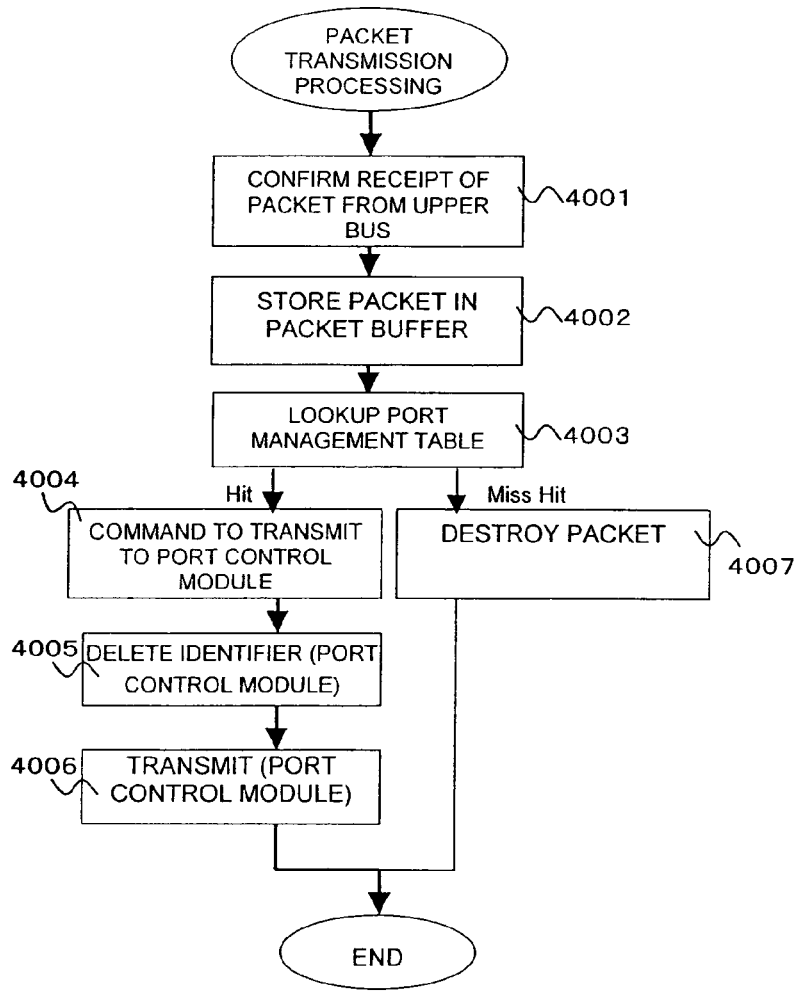
FIG. 12 is a flowchart showing a packet processing sequence in a transmission-side routing module.

FIG. 12 is a flowchart showing a packet processing sequence of a transmitting side routing module.

The IP packet is transmitted from the extended function module 6 to the upper BUS 1, and is received by the upper BUS transceiver 10 of the routing module 33. The upper BUS transceiver 10 consults the module number 102 of the identifier 101 appended to the IP packet, and confirms that this module was the intended destination of the received IP packet (step 4001). The upper BUS transceiver 10 stores the IP packet in the packet buffer 13 (step 4002). The port management table lookup unit 15 looks up the port management table 16, using the link number 103 contained in the identifier 101 of the IP packet as a lookup key (step 4003). When the port management table lookup unit 15 locates an entry which stores a link number 401 matching the lookup key (i.e. when the lookup is a hit), the port management table lookup unit 15 reads from that entry the physical link number 402 of the link which is transmitting the IP packet. The lower BUS transceiver 1 9 identifies the link 23 corresponding to the physical link number 402 which has been read, and issues a command to transmit the IP packet to the port control module 53 which controls that link 23 (step 4004). The lower BUS transceiver 19 extracts the IP packet from the packet buffer 13 and transmits the IP packet to the lower BUS 43. The port control module 53 receives the command, obtains the IP packet from the lower BUS 43, and deletes the identifier 101 which is appended to the IP packet (step 4005). Then, the port control module 53 transmits the IP packet to the specified link 23 (step 4006).

When the lookup in step 4003 was a mis-hit, the port management table lookup unit 15 stops the processing. Then, the routing module 33 destroys the IP packet stored in the packet buffer 13 (step 4007) and ends transmission processing.

Incidentally, as described above, at the time of transmitting the packet from the routing module 33 to the port control module 53, when the lower BUS transceiver 19 deletes the identifier 101, the port control module 53 need not delete the identifier 101. Therefore, step 4005 is unnecessary.

Subsequently, a constitution wherein the extended function processing module is connected to the routing module via an interface which is different to the lower BUS, which the routing module is connected to, will be explained. According to this constitution, the extended function processing module can be connected to the routing module with minimal modifications to the hardware of the routing module. In the actual apparatus, for example, the routing module and the extended function processing module are both mounted on a single board, and connected by a general-purpose BUS or a special interface.

In this constitution, a high-speed routing module can be used, enabling the packet to be transmitted at high speed between the extended function processing module and the upper BUS 1.

Figure 13:
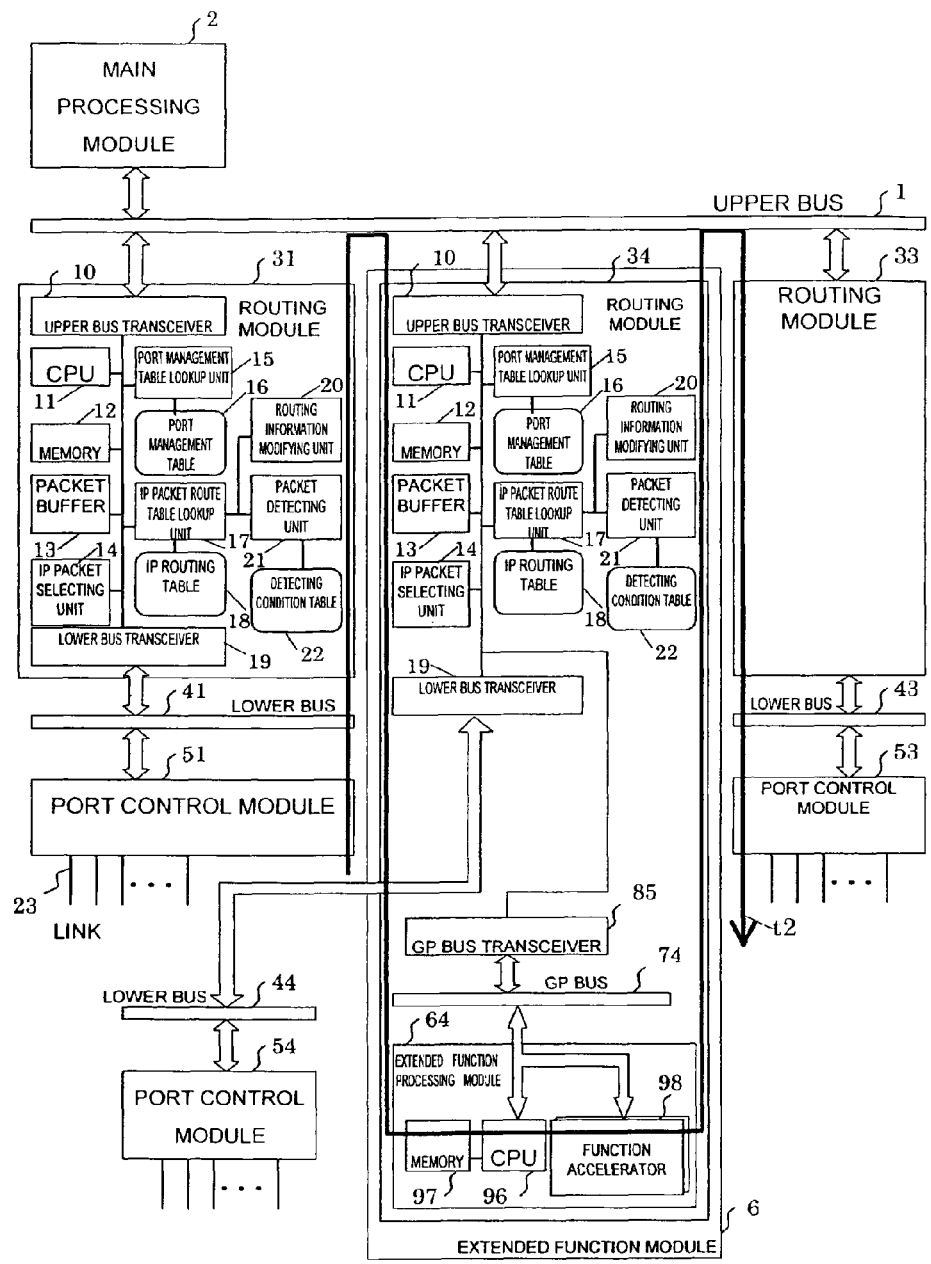
FIG. 13 is another example of a detailed block diagram of a router.

FIG. 13 is a detailed block diagram of a router having the above constitution. In FIG. 13, the same parts as those shown in FIG. 3 are represented by the same reference numbers. In the explanation below, the parts of the constitution which differ from the constitution of FIG. 3 will mainly be explained.

In FIG. 13, the extended function module 6 has a constitution which processes complex protocols by using software, and comprises the extended function processing module 64, which a constitution for high-speed processing by using hardware is mounted on. The extended function processing module 64 comprises a CPU 96 which is connected to the GP BUS 74, a memory 97 for the CPU 96, and one or a plurality of function accelerators 98 which connect to the GP BUS 74.

Numbers, which are unique within the router, are allocated to the modules 31, 33, and 34. These numbers are termed "module numbers". Numbers, which are unique within the routing module, are allocated to the port control modules 51, 53, and 54, and the extended function processing module 64. These numbers are termed "physical port control module numbers". Numbers, which are unique within the all the port control modules, are allocated to the links 23 which connect to the port control modules 51, 53, and 54. These numbers are termed "physical link numbers". A logical link number, used only in the router, may also be provided in correspondence with the physical link number. The logical link numbers and physical link numbers need not correspond in a one-to-one arrangement.

The routing modules 31, 33, and 34 have the same constitution. Each routing module comprises an upper BUS transceiver 10, a CPU 11, a memory 12, a packet buffer 13, an IP packet selecting unit 14, a port management table lookup unit 15, a port management table 16, an IP packet route table lookup unit 17, an IP routing table 18, a lower BUS transceiver 19, a routing information modifying unit 20, a packet detecting unit 21, and a detecting condition table 22. In addition, the routing module 34 further comprises a GP BUS transceiver 85. The routing module 34 connects via the GP BUS 74 to the extended function processing module 64.

The constitution of each of the routing modules is the same as that shown in FIG. 3, and the constitution and operation is the same as that described above. The identifiers are appended in the routing module in the same manner as that already described above.

Subsequently, a processing sequence of the router shown in FIG. 13 will be explained. The operation relating to the flow of packet data in this embodiment will be explained. The arrow line t2 shown in FIG. 3 represents the flow of the packet. The processing sequence of the router will be explained in correspondence with the flow of the packet. The port processing sequence of the packet by the receiving side routing module 31 of the router is the same as that shown by the flowchart of FIG. 8. Similarly, the processing sequence of the packet by the receiving side routing module 33 of the router is the same as that shown by the flowchart of FIG. 12. Since these processing sequence are identical to those above, they will not be explained further. The packet processing sequence of the routing module 34 of this router, and the packet processing sequence of the extended function processing module 64, will be explained.

Figure 14:
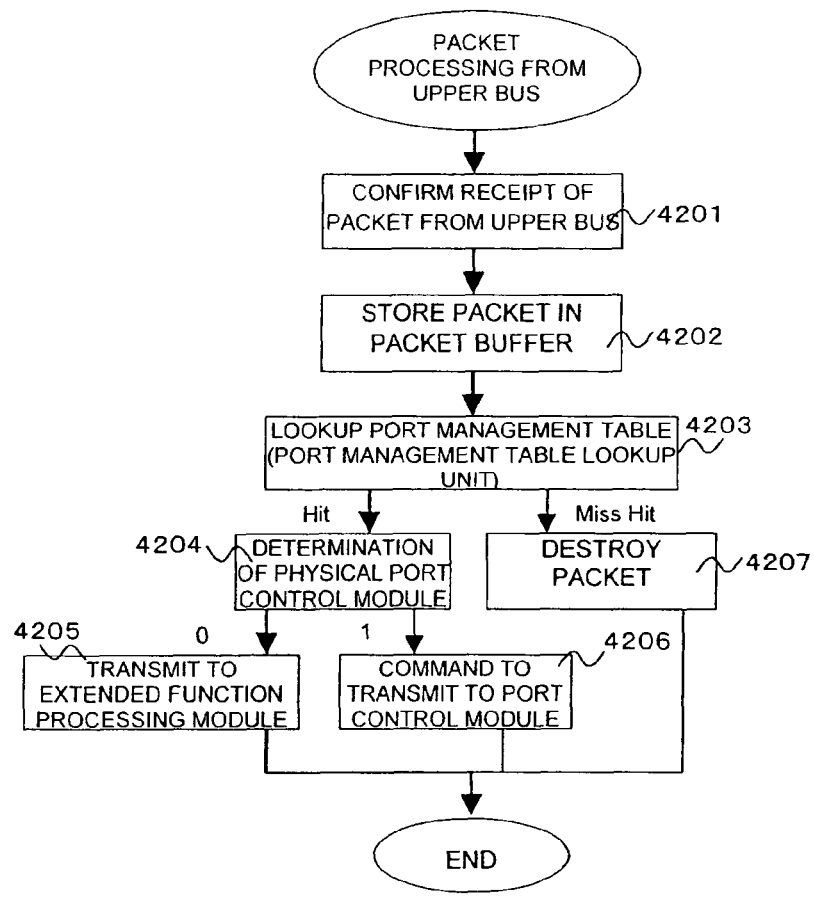
FIG. 14 is a flowchart showing a packet processing sequence in the routing module shown in FIG. 13.

FIG. 14 is a flowchart showing the packet processing sequence of the routing module 34.

The upper BUS transceiver 10 of the routing module routing module 34 receives the IP packet from the upper BUS 1. The upper BUS transceiver 10 consults the module number 102 of the identifier 101 appended to the IP packet, and confirms that this module was the intended destination of the received IP packet (step 4201). The upper BUS transceiver 10 stores the IP packet in the packet buffer 13 (step 4202). The port management table lookup unit 15 looks up the port management table 16, using the link number 103 contained in the identifier 101 of the IP packet as a lookup key (step 4203). When the port management table lookup unit 15 locates an entry which stores a link number 401 matching the lookup key (i.e. when the lookup is a hit), the port management table lookup unit 15 reads from that entry the physical port control module number 403 and the physical link number 402 of the link which is transmitting the IP packet.

The lower BUS transceiver 19 consults the value of the physical port control module number 403 which has been read, and determines whether this value is the physical port control module number allocated to the port control module 54 (step 4204). When the physical port control module number 403 is the physical port control module number of the port control module 54, the lower BUS transceiver 19 identifies the link 23 corresponding to the physical link number 402 which has been read, and commands the port control module 54 to transmit the IP packet (step 4206). In addition, the lower BUS transceiver 19 extracts the IP packet from the packet buffer 13, and transmits it to the lower BUS 44.

On the other hand, the GP BUS transceiver 85 also consults the value of the physical port control module number 403, and determines whether this value is the physical port control module number allocated to the extended function processing module 64 (step 4204).

When the physical port control module number 403, which has been read, is the physical port control module number of the extended function processing module 64, the GP BUS transceiver 85 extracts the IP packet from the packet buffer 13 and transmits it to the GP BUS 74 (step 4205). Incidentally, the extended function module 6 can comprise a plurality of extended function processing modules 64, executing a plurality of append functions. In this case, the GP BUS transceiver 85 determines whether the physical port control module number 403, which has been read, is a physical port control module number allocated to one of the extended function processing modules 64, and identifies the extended function processing module 64 which the packet is to be handed to. Furthermore, when transmitting the IP packet to the GP BUS 74, the GP BUS transceiver 85 may also transmit the physical port control module number 403 and the physical link number 402, which have been read, to the lower BUS 42. Alternatively, the GP BUS transceiver 85 may append the physical port control module number 403 and the physical link number 402 to the IP packet as identifiers before transmitting the IP packet to the GP BUS 74.

When the lookup in step 4203 was a mis-hit, the port management table lookup unit 15 ends the processing. Then, the routing module 34 destroys the IP packet stored in the packet buffer 13 (step 4207) and ends transmission processing.

FIG. 15 is a flowchart showing a packet processing sequence of the extended function processing module 64.

The function accelerator 98 of the extended function processing module 64 receives the IP packet from the GP BUS 74 (step 2202).

Incidentally, the extended function processing module 64 may comprise a plurality of function accelerators 98, and execute a plurality of append functions. In this case, each of the function accelerators 98 confirms that an IP packet has been received by itself based on the physical link number 402 and the physical port control module number 403, which were transmitted from the GP BUS transceiver 85 together with the IP packet. Furthermore, the extended function processing module 64 may comprise a plurality of function accelerators which execute identical append functions. In this case, for example, the GP BUS transceiver 85 uses the values of the physical link number 402 and the physical port control module number 403, which have been read, to select one of the function accelerators 98, and transmits the packet. Alternatively, any one of the plurality of function accelerators 98 may receive the IP packet based on the values of the physical link number 402 and the physical port control module number 403, transmitted from the GP BUS transceiver 85. Therefore, the extended function processing module 64 can distribute the processing among the plurality of function accelerators 98.

The function accelerator 98 executes a process relating to an append function to the IP packet(step 2203).

After completing the process, the function accelerator 98 deletes the identifier 101 appended to the packet (step 2204), and transmits the packet to the GP BUS 74 (step 2205).

In the same way as already described above, for example, when executing an IP sec function in the tunneling mode, the function accelerator 98 appends a new IP header to the head of the IP packet, and creates a new IP packet. When coding the IP packet, the function accelerator 98 codes only the original IP packet without the identifier 101. Therefore, in such a case, the function accelerator 98 can delete the identifier 101 (step 2204), and thereafter perform processing relating to append functions (step 2203). FIG. is a flowchart showing the packet processing sequence of the extended function processing module 64 in this case.

As described above, when the GP BUS transceiver 85 of the routing module 34 deletes the identifier 101 immediately prior to transmitting the IP packet to the extended function processing module 64, the function accelerator 98 need not delete the identifier 101. Therefore, step 2204 is not necessary. Furthermore, when the GP BUS transceiver 85 of the routing module 34 stores the IP packet, received from the GP BUS 74, in the packet buffer 13, the GP BUS transceiver 85 rewrites a new identifier 101 over the identifier 101 appended to the packet; similarly, in this case, the function accelerator 98 does not need to delete the identifier 101.

Figure 16:
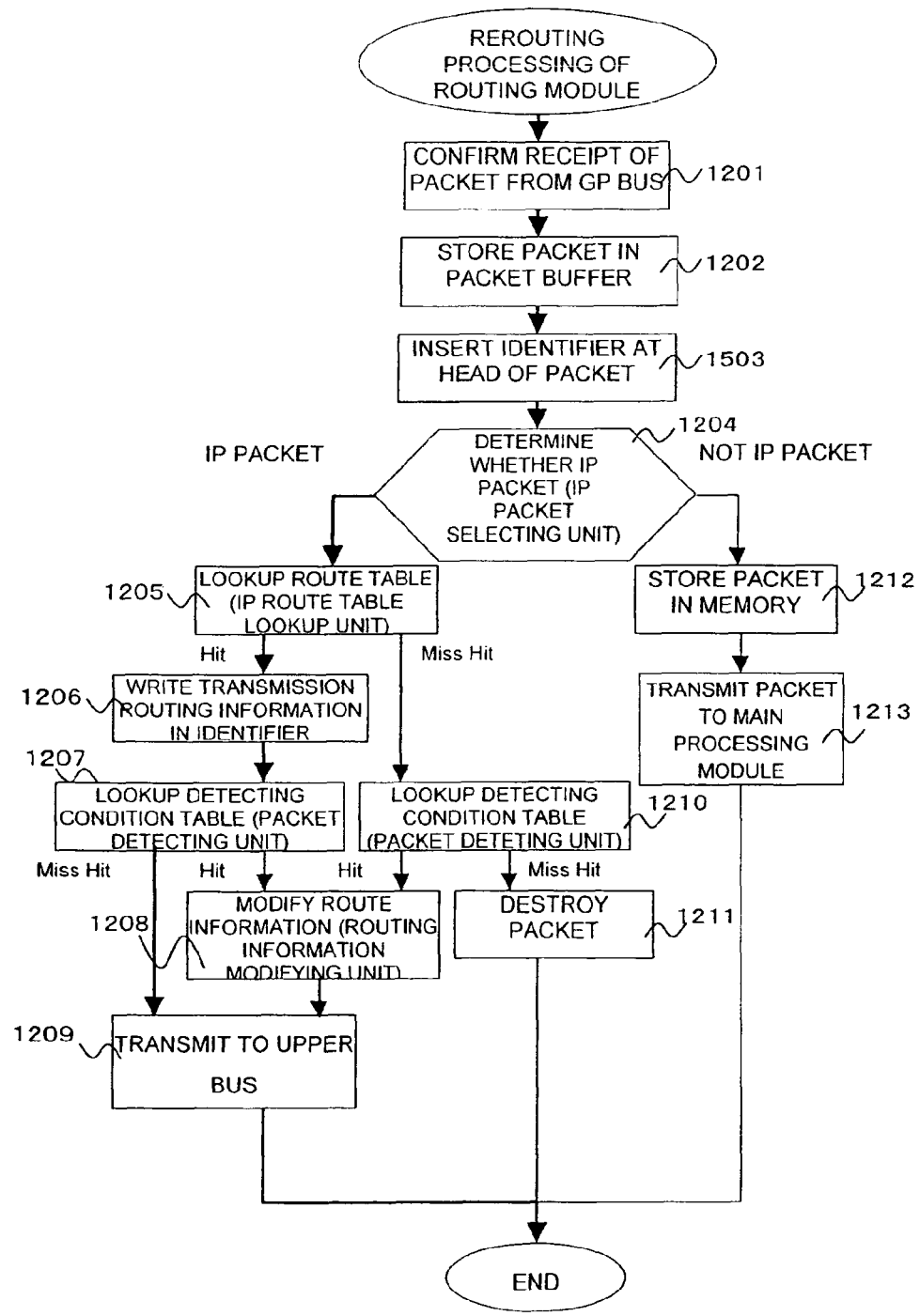
FIG. 16 is a flowchart showing a packet processing sequence of the routing module shown in FIG. 13 when rerouting.

FIG. 16 is a flowchart showing a packet processing sequence of the routing module 34 when rerouting.

The GP BUS transceiver 85 of the routing module 34 receives the packet from the GP BUS 74 (step 1201) and stores it in the packet buffer 13 (step 1202). At this time, the GP BUS transceiver 85 appends an identifier 101 to the head of the packet, and stores in the packet in the packet buffer 13 (step 1203).

The IP packet selecting unit 14 determines whether the packet stored in the packet buffer 13 is an IP packet (step 1204). When the packet is an IP packet, the IP packet route table lookup unit 17 looks up the routing table 18 (step 1205). In looking up, the IP packet route table lookup unit 17 uses a sub net mask 202, stored in one entry of the routing table 18, to extract the network address section from the destination IP address, contained in the IP header of the IP packet. The IP packet route table lookup unit 17 uses the sub net mask 202 to extract the network address section from the destination IP address 201 of that entry. The IP packet route table lookup unit 17 compares the values of the two extracted network address sections, and determines whether they match. The IP packet route table lookup unit 17 continues to determine each entry of the routing table 18 until two network address sections match. When an entry where two network address sections match is located (i.e. when the lookup is a hit), the IP packet route table lookup unit 17 reads the transmission route information (module number 203, link number 204, and subsequent IP address 205) from that entry.

The routing information modifying unit 20 stores the values of the read module number 203, link number 204, and subsequent IP address 205, in each field of the identifier 101 which is appended to the IP packet (step 1206).

Then, the packet detecting unit 21 looks up the lookup condition 301 in the detecting condition table 22, comprising the IP address contained in the IP packet or protocol information from a higher layer (step 1207). This IP packet is already being processed by the extended function processing module 64. For this reason, unless there is a need for further processing by another extended function module, the lookup by the packet detecting unit 21 in step 1207 is unsuccessful. Therefore, the packet detecting unit 21 ends the processing. Thereafter, the upper BUS transceiver 10 reads the IP packet stored in the packet buffer 13, and transmits the IP packet via the upper BUS 1 to the destination routing module 33 in compliance with the module number 102 of the identifier 101, appended 25 to the IP packet (step 1209).

On the other hand, in step 1207, when the packet detecting unit 21 finds a lookup condition 301 matching the information contained in the IP packet (when the lookup is a hit), the packet detecting unit 21 confirms that the IP packet is one which should be IP append function processed, and reads the module number 302 of the extended function module which will perform the processing, the link number 303, and the subsequent IP address 304, from the entry with the matching lookup condition 301.

The routing information modifying unit 20 modifies and stores the module number 302, link number 303, and subsequent IP address 304, which have been read from the detecting condition table 22 by the packet detecting unit 21, in each field of the identifier 101 (step 1208). The upper BUS transceiver 10 transmits the IP packet, stored in the packet buffer 13, via the upper BUS 1 to another extended function module at the destination in compliance with the module number 102 of the identifier 101, appended to the packet (step 1209). In this way, the routing module 34 can transmit the IP packet to another extended function module.

When the lookup in step 1205 was a mis-hit, the IP packet route table lookup unit 17 ends the processing. Since the IP packet route table lookup unit 17 cannot read the transmission route information, the routing information modifying unit 20 performs no processing at this time.

Subsequently, the packet detecting unit 21 looks up the detecting condition table 22 as in step 1207 (step 1210). When this lookup is a hit, as in step 1207, the packet detecting unit 21 reads the transmission route information, comprising the module number 302 and the like, from the detecting condition table 22. In this case, the routing information modifying unit 20 executes step 1208 and stores the values read by the packet detecting unit 21 in the fields of the identifier 101. When the lookup in step 1210 was not a hit, the packet detecting unit 21 ends the processing. In this case, the routing module 34 destroys the IP packet stored in the packet buffer 13 (step 1211) and ends the receive processing.

Incidentally, when the extended function processing module 64 has converted the IP packet to a packet which is not an IP packet, the IP packet selecting unit 14 determines in step 1204 that the packet is not an IP packet. In this case, the IP packet selecting unit 14 stores the packet in the memory 12, managed by the CPU 11 (step 1212). The software, executed by the CPU 11, transmits the packet via the upper BUS transceiver 10 and the upper bus 1 to the main processing module 2 (step 1213). The main processing module 2 receives the packet, identifies the type of the packet, and processes the packet in accordance with its type. If the packet is one which needs to be relayed, the main processing module 2 executes relay processing.

Subsequently, one example of a constitution where the extended function module comprises a plurality of extended function processing modules will be explained.

Figure 17:
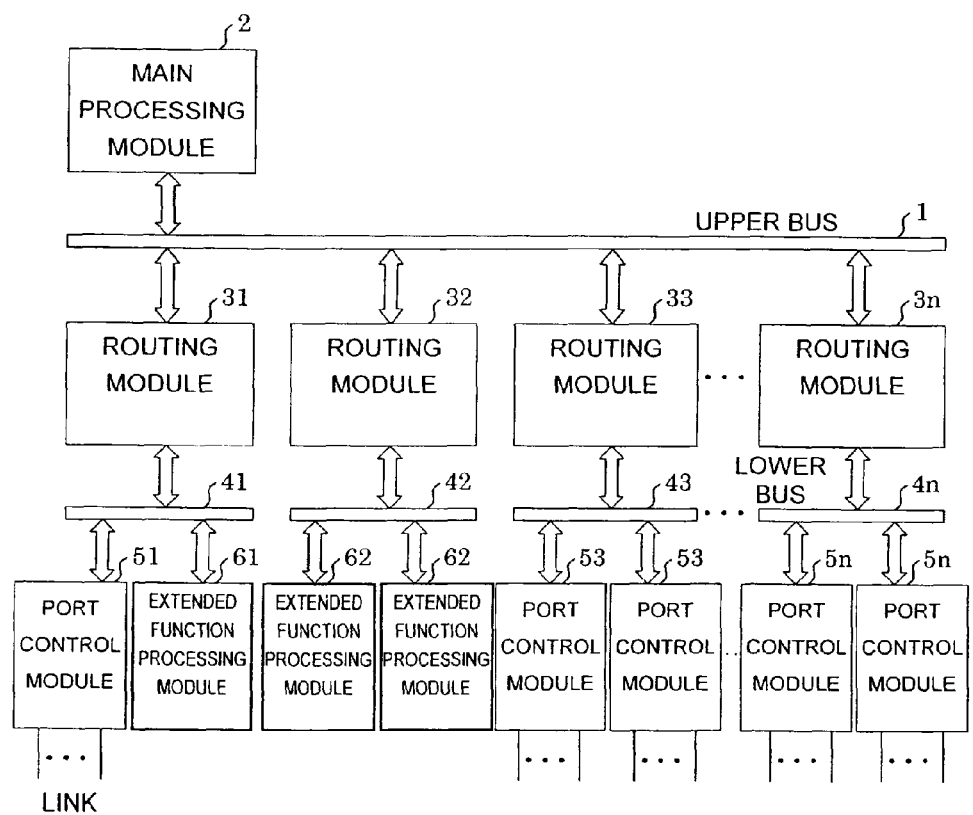
FIG. 17 is another block diagram of a router.
Figure 18:
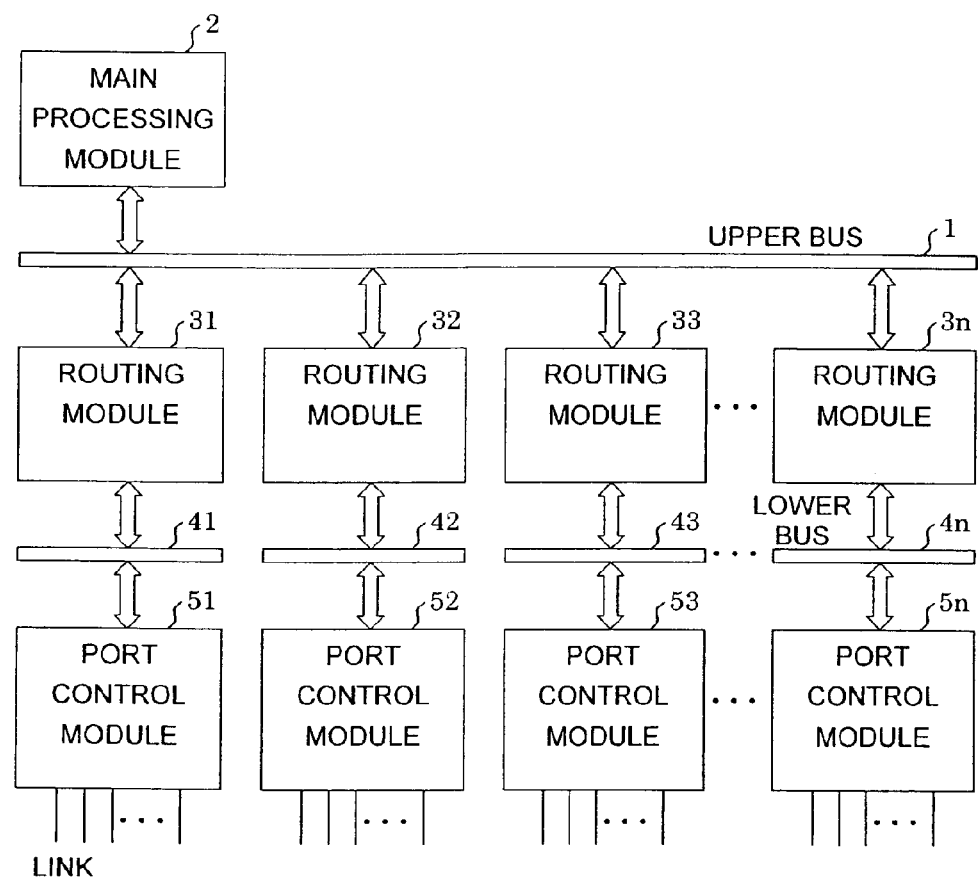
FIG. 18 is a block diagram showing a router disclosed in a known document.

FIG. 17 is a block diagram of the router in a case where a plurality of extended function processing modules are connected to one routing module.

As shown in FIG. 17, a plurality of extended function processing modules 62 may be connected via the lower BUS 42 to one routing module 32. Furthermore, the port control module 51 and the extended function processing module 61 may be connected via the same lower BUS 41 to one routing module 31.

Packets are, for example, distributed to the port control modules and extended function processing modules, connected to one lower BUS, in the same way as described above in step 4204 shown in FIG. 14. Specifically, the lower BUS transceiver 19 of the routing module 32 consults the value of the physical port control module number 403 which has been read, and determines whether this value is the physical port control module number of the port control module 51, or the physical port control module number of the extended function processing module 61. Depending on the result of this determination, the lower BUS 19 transmits the packet to one of the two modules. Alternatively, the lower BUS 19 may identify the destination module by using the values of the physical port control module number 403 and the physical link number 402. According to the above determination, the lower BUS 19 is able to identify two or more port control modules and extended function processing modules.

As described above, the router of this invention comprises one or a plurality of extended function modules, which can perform append function processing and routing processing at high-speed. Therefore, the router can execute various append functions to the packet when relaying the packet.

What is claimed is:

1. A packet routing apparatus comprising:
    at least one routing unit;
    at least one port controller, which includes at least one port, connected to the at least one routing unit,
    wherein the at least one port controller receives a packet from an external network through a first port of the at least one port, transmits a packet to the at least one routing unit, receives a packet from the at least one routing unit, and transmits a packet to the external network through the first port; and
    at least one extended function processing unit connected to the at least one routing unit,
        wherein the at least one extended function processing unit receives a packet from the at least one routing unit, and executes a predetermined process for the packet from the at least one routing unit, and
        wherein when the at least one routing unit has received a packet from the at least one port controller or the at least one extended function processing unit, the at least one routing unit transmits the packet from the at least one port controller or the at least one extended function processing unit to the at least one port controller or the at least one extended function processing unit.

2. The packet routing apparatus according to claim 1, wherein the predetermined process is a packet data work process.

3. The packet routing apparatus according to claim 1, wherein the predetermined process is a coding process.

4. The packet routing apparatus according to claim 1, wherein the predetermined process is an IPsec process.

5. The packet routing apparatus according to claim 1, wherein the predetermined process is an accelerated process performed by hardware.

6. A packet routing apparatus comprising:
    a first extended function processing unit;
    a first port controller including at least one first port; and
    a first routing unit connected to the first port controller and the first extended function processing unit,
    wherein the first port controller receives a packet from an external network through a port of the at least one first port, transmits a packet to the first routing unit, receives a packet from the first routing unit, and transmits a packet to the external network through the first port,
    wherein the first extended function processing unit receives a packet from the first routing unit, and executes a first predetermined process for the packet from the first routing unit, and when the first predetermined process has been executed for the packet, the first extended function processing unit transmits the packet to the first routing unit, and
    wherein the first routing unit transmits the packet received from the first extended function processing unit to the first port controller, and the first port controller transmits the packet received from the first routing unit to the external network through the port of the at least one first port.

7. The packet routing apparatus according to claim 6, further comprising:
    two second port controllers, each second port controller including at least one second port connected to another external network; and
    a second routing unit connected to the first routing unit and the two second port controllers,
    wherein when the second routing unit has received a packet from the first routing unit, the second routing unit transmits the packet from the first routing unit to any one of the two second port controllers, and the any one of the two second port controllers transmits the packet from the second routing unit to the another external network through the at least one second port.

8. The packet routing apparatus according to claim 6, further comprising:
    two second extended function processing units; and
    a second routing unit connected to the first routing unit and the two second extended function processing units,
        wherein any one of the two second extended function processing units receives a packet from the second routing unit, executes a second predetermined process for the packet from the second routing unit, and transmits the packet to the second routing unit when the second predetermined process has been executed, and
        wherein when the second routing unit receives the packet from the any one of the two second extended function processing units, the second routing unit transmits the packet to the first routing unit.

9. The packet routing apparatus according to claim 6, further comprising:
    a second extended function processing unit;
    a second port controller including at least one second port connected to another external network; and
    a second routing unit connected to the first routing unit, the second extended function processing unit and the second port controller,
        wherein the second port controller receives a packet from the another external network through a port of the at least one second port, transmits a packet to the first routing unit, receives a packet from the first routing unit, and transmits a packet to the external network through the port of the at least one second port,
        wherein the second extended function processing unit receives a packet from the second routing unit, executes a second predetermined process for the packet from the second routing unit, and transmits the packet executed the second predetermined process to the second routing unit, and
        wherein the second routing unit receives the packet executed the second predetermined process from the second extended function processing unit, and transmits the packet executed the second predetermined process to the first routing unit or the second port controller.

10. The packet routing apparatus according to claim 6, wherein the predetermined process is a packet data work process.

11. The packet routing apparatus according to claim 6, wherein the predetermined process is a coding process.

12. The packet routing apparatus according to claim 6, wherein the predetermined process is an IPsec process.

13. The packet routing apparatus according to claim 6, wherein the predetermined process is an accelerated process performed by hardware.

14. A packet routing apparatus comprising:
- a port controller including at least one port;
- a first routing unit connected to the port controller;
- a second routing unit connected to the first routing unit; and
- an extended function processing unit connected to the second routing unit,
- wherein the port controller receives a packet from an external network through a port of the at least one port, transmits a packet to the first routing unit, receives a packet from the first routing unit, and transmits a packet to the external network through the port,
- wherein the extended function processing unit receives a packet from the second routing unit, and executes a predetermined process for the packet from the second routing unit, and
- wherein when the second routing unit has received a packet from the first routing unit or the extended function processing unit, the second routing unit transmits the packet from the first routing unit or the extended function processing unit to the first routing unit or the extended function processing unit.

15. The packet routing apparatus according to claim 14, wherein the second routing unit and the extended function processing unit are both mounted on one board.

16. The packet routing apparatus according to claim 14, wherein the predetermined process is a packet data work process.

17. The packet routing apparatus according to claim 14, wherein the predetermined process is a coding process.

18. The packet routing apparatus according to claim 14, wherein the predetermined process is an IPsec process.

19. The packet routing apparatus according to claim 14, wherein the predetermined process is an accelerated process performed by hardware.

* * * * *